US012234976B2

(12) United States Patent
Zhao

(10) Patent No.: US 12,234,976 B2
(45) Date of Patent: Feb. 25, 2025

(54) LIGHTING SYSTEM ASSEMBLED FROM LIGHTING FIXTURES

(71) Applicant: Xueliang Zhao, Ningbo (CN)

(72) Inventor: Xueliang Zhao, Ningbo (CN)

( * ) Notice: Subject to any disclaimer, the term of this patent is extended or adjusted under 35 U.S.C. 154(b) by 0 days.

(21) Appl. No.: 18/398,062

(22) Filed: Dec. 27, 2023

(65) Prior Publication Data

US 2024/0125463 A1 Apr. 18, 2024

(30) Foreign Application Priority Data

Nov. 8, 2023 (CN) ......................... 202323016900.9

(51) Int. Cl.
*F21V 23/06* (2006.01)
*F21S 4/28* (2016.01)

(52) U.S. Cl.
CPC ................ *F21V 23/06* (2013.01); *F21S 4/28* (2016.01)

(58) Field of Classification Search
CPC ........ F21S 8/02; F21S 8/06; F21S 4/28; F21S 2/005; H01R 25/003; H01R 25/14; F21V 21/005; F21V 21/02; F21V 21/048; F21V 23/001–002
See application file for complete search history.

(56) References Cited

U.S. PATENT DOCUMENTS

| | | | | |
|---|---|---|---|---|
| 4,764,128 | A * | 8/1988 | Cheng | H01R 25/003 439/655 |
| 10,288,237 | B2 * | 5/2019 | Li | F21V 19/004 |
| 10,976,042 | B1 * | 4/2021 | Chen | F21V 23/06 |
| 11,774,050 | B2 * | 10/2023 | Boroski | F21K 9/27 362/253 |
| 2009/0147504 | A1 * | 6/2009 | Teeters | F21V 33/006 362/153 |
| 2021/0141145 | A1 | 5/2021 | Hawthorne et al. | |
| 2022/0057101 | A1 | 2/2022 | Haraguchi | |
| 2023/0381365 | A1 | 11/2023 | McMillan | |

FOREIGN PATENT DOCUMENTS

EP 4317767 A1 * 2/2024 .............. F21S 2/005

OTHER PUBLICATIONS

Innovation Q+ NPL Search (Year: 2024).*

* cited by examiner

*Primary Examiner* — Anabel Ton

(57) ABSTRACT

The present invention discloses a lighting system assembled from lighting fixtures, including electrical connection sockets, electric connectors, a connecting structure, and plug connectors. A plurality of single lighting fixtures are assembled and mounted on the connecting structure by fitting the electrical connection sockets to the connecting structure so that the lighting fixtures can be easily assembled on the ceiling without complicated wiring.

10 Claims, 20 Drawing Sheets

LIGHTING SYSTEM ASSEMBLED FROM LIGHTING FIXTURES

TECHNICAL FIELD

The present invention belongs to the field of lighting fixtures and specifically relates to a lighting system assembled from lighting fixtures.

BACKGROUND

Lighting fixtures are essential for both home lighting and public lighting, especially ceiling-mounted lighting fixtures suspended at a high height. However, in the prior art, multiple lighting fixtures could be mounted on the ceiling by wiring and complex physical connections only after complicated wiring of electrical connection lines above the ceiling in advance. Moreover, the existing lighting fixtures are generally surface-mounted lighting fixtures, which, if assembled, make it more costly due to occupying a large area and are only suitable for places with a large mounting surface.

SUMMARY

To solve the shortcomings of the above technology, the present invention provides a lighting system assembled from lighting fixtures having the following structure.

According to the present invention, a lighting system assembled from lighting fixtures is designed, including:

electrical connection sockets, where the electrical connection sockets are provided on single lighting fixtures;

electrical connectors, where two plugs are electrically connected to the electrical connectors;

a connecting structure, where the connecting structure is used for assembling and connecting the plurality of single lighting fixtures; and plug connectors, where the plug connectors are provided on the electrical connection sockets, the connecting structure includes a plurality of frames; the frames of the single lighting fixtures are located beside the single lighting fixtures, a first plug-in portion is provided on each frame, and the first plug-in portion is fitted to a second plug-in portion of the single lighting fixture to position the single lighting fixture on the frames; the first plug-in portion is a convex slotting piece, a second plug-in portion of the single lighting fixture is a slot fitted to the slotting piece, a first receiving slit is provided on the electrical connection socket, the first receiving slit is assembled with the slot to form an inserting channel, and the slotting piece is inserted into the inserting channel.

Every two adjacent frames of the plurality of frames are spliced perpendicularly to each other and arranged linearly each, and every two spaced frames are arranged in parallel; when all the single lighting fixtures are linearly arranged on the frames respectively, the plurality of single lighting fixtures are assembled linearly; when all the single lighting fixtures are perpendicularly arranged on the frames, the plurality of single lighting fixtures are assembled perpendicularly to each other, and the frames for arranging the single lighting fixtures are parallel to the single lighting fixtures.

The lighting system assembled from lighting fixtures described in the present invention has the following beneficial effects.

1. The slotting piece on the frame is fitted to the inserting channel and the third receiving slit on the single lighting fixture so that the lighting fixtures can be mounted on the frame easily. To assemble the plurality of single lighting fixtures, the inserting piece is inserted into one single lighting fixture and into the third receiving slit on another single lighting fixture. In this way, the plurality of single lighting fixtures can be assembled, enabling the lighting system to be assembled on the connecting structure easily and fast.
2. The plurality of single lighting fixtures are plugged into each other by the plugs and the plug connectors, allowing for easy electrical connection. The plurality of single lighting fixtures can be powered by just one driver box without complicated wiring and connection in advance.

Moreover, the single lighting fixture in the present invention, in its initial state, may form a regular shape, for example, a cuboid or cylindrical shape, to facilitate packaging and transportation and improve the aesthetics of assembled products, and is also suitable for small-area assembly.

3. The driver box is mounted on the frames with a snap-in structure so that the driver box can be mounted easily without screws and nuts.

DETAILED DESCRIPTION

Figure 1:
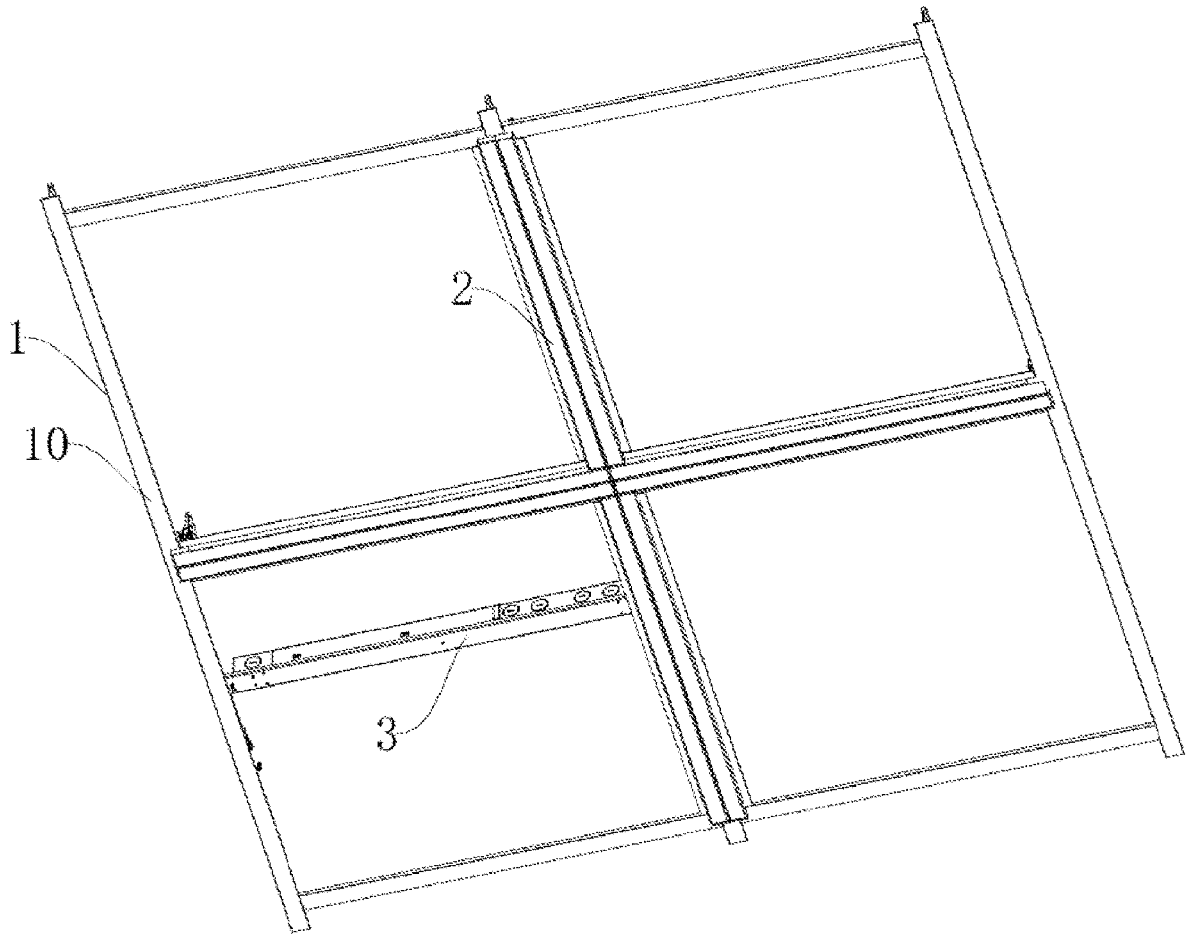
FIG. 1 is a front view of an integral assembly structure according to the present invention.
Figure 2:
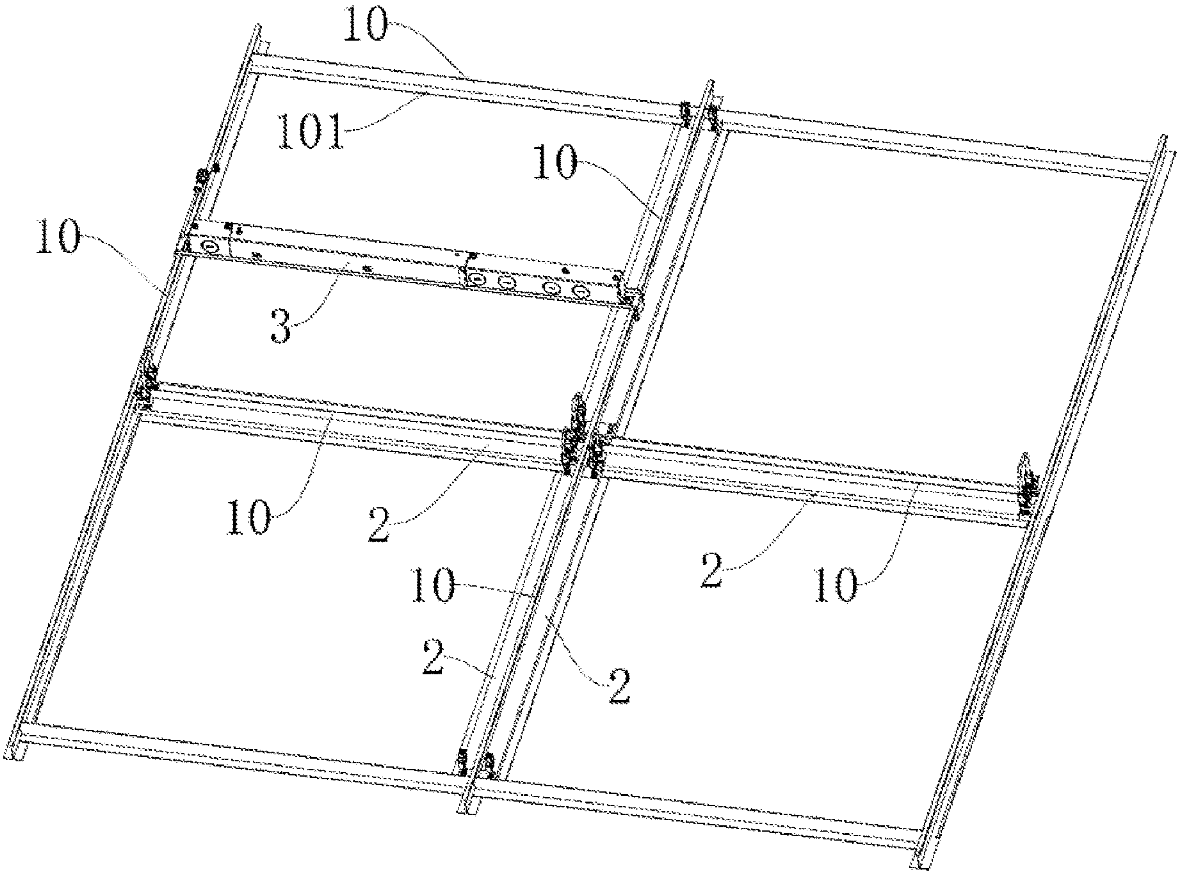
FIG. 2 is a back view of the integral assembly structure according to the present invention.
Figure 3:
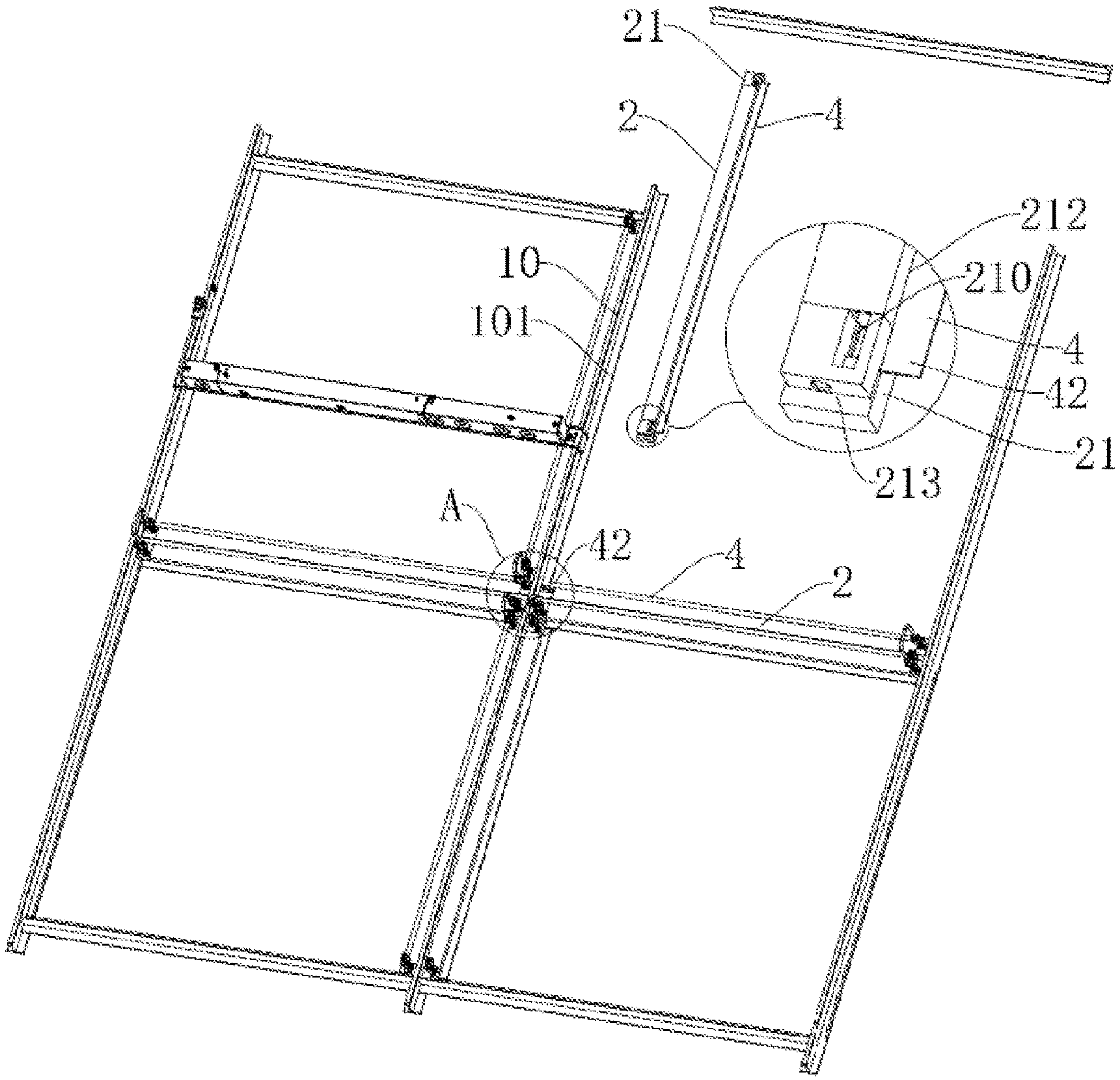
FIG. 3 is an exploded view (I)
Figure 4:
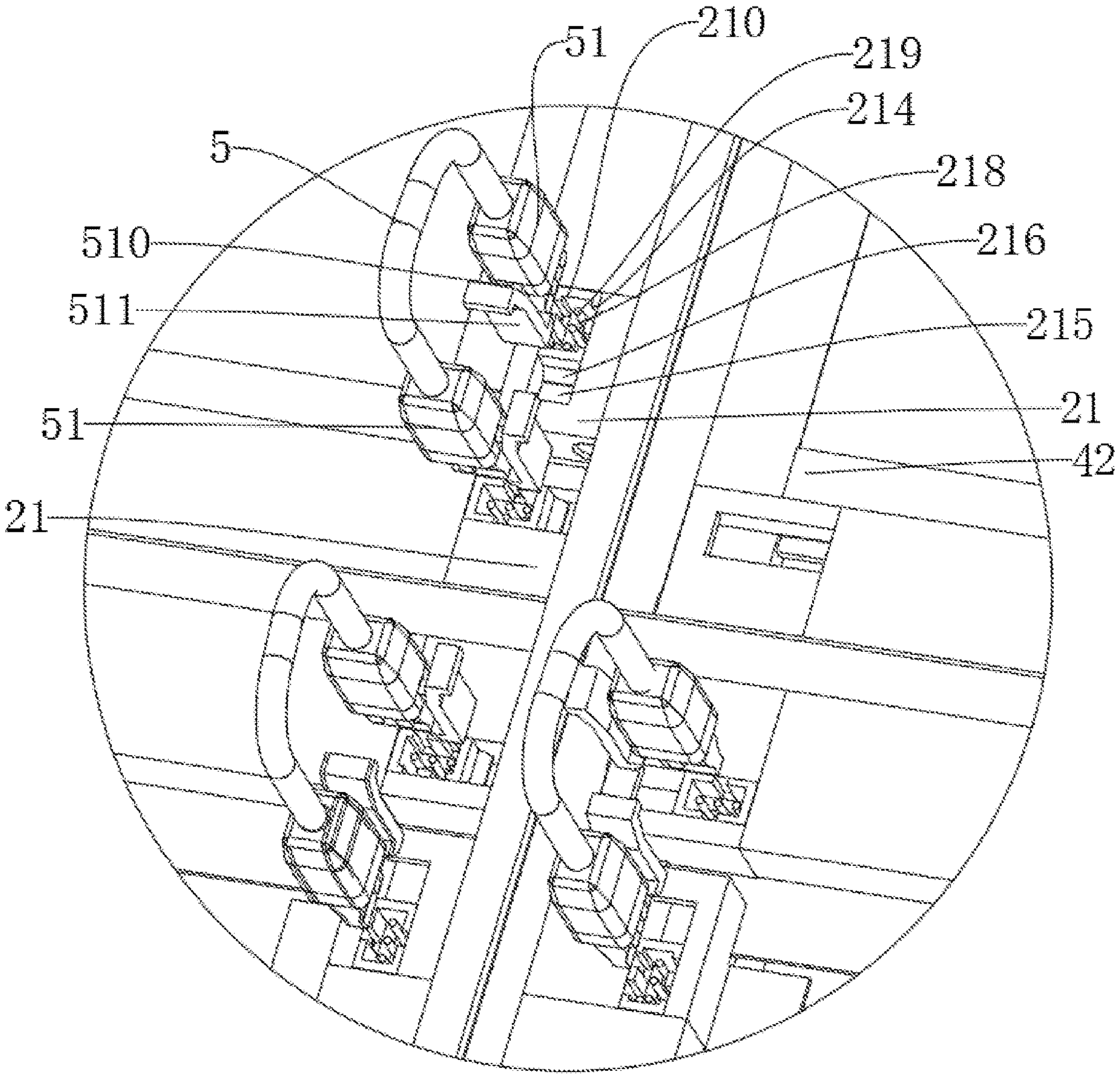
FIG. 4 is an enlarged view at A.
Figure 5:
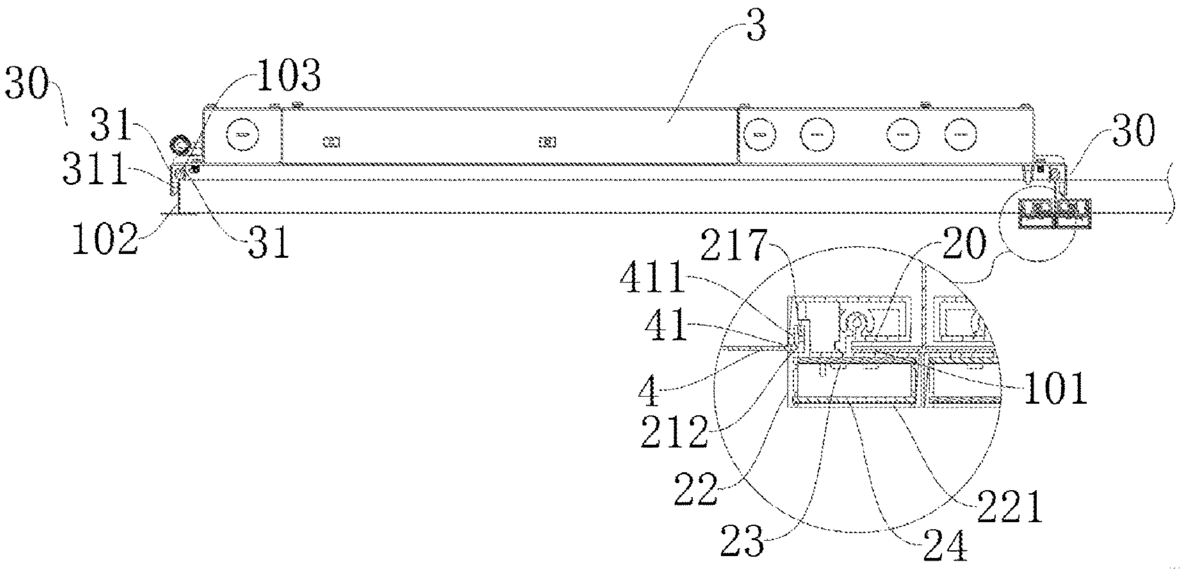
FIG. 5 is a sectional view of an overall structure.
Figure 6:
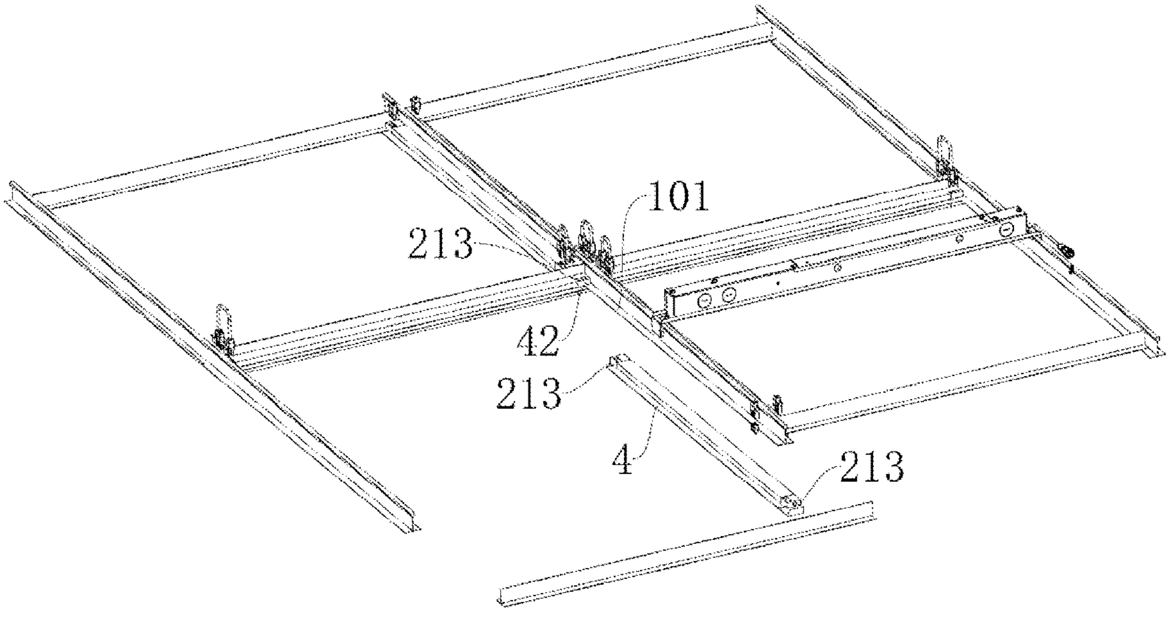
FIG. 6 is an exploded view (T)
Figure 7:
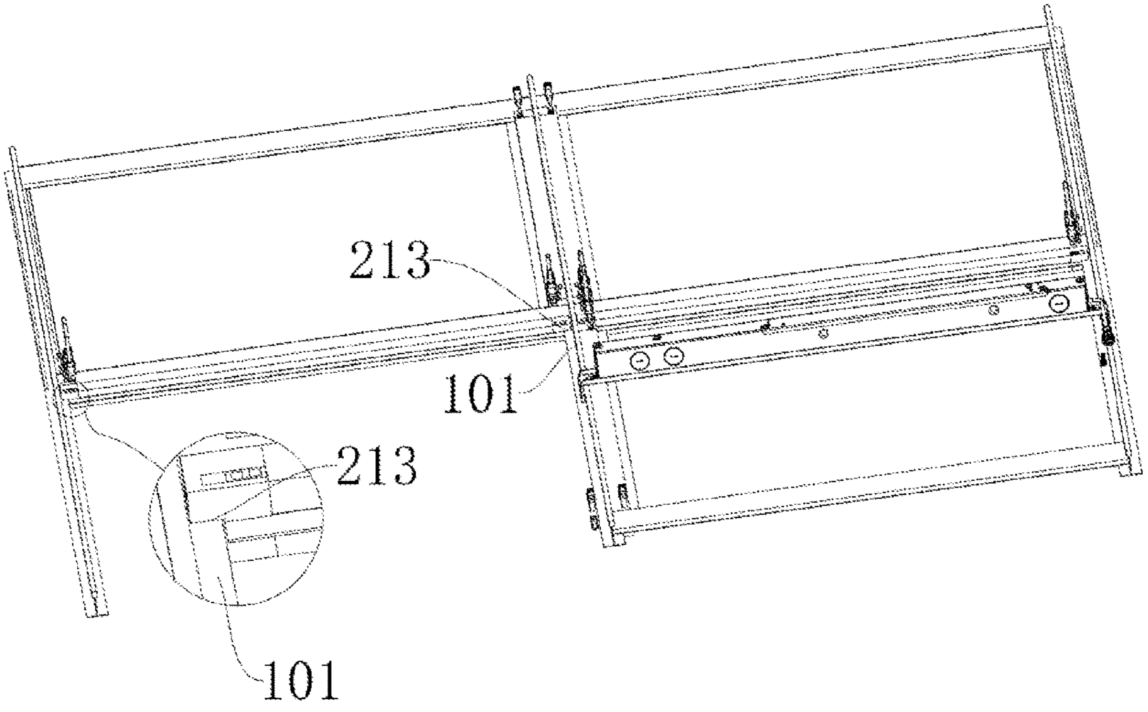
FIG. 7 is a partial view.
Figure 8:
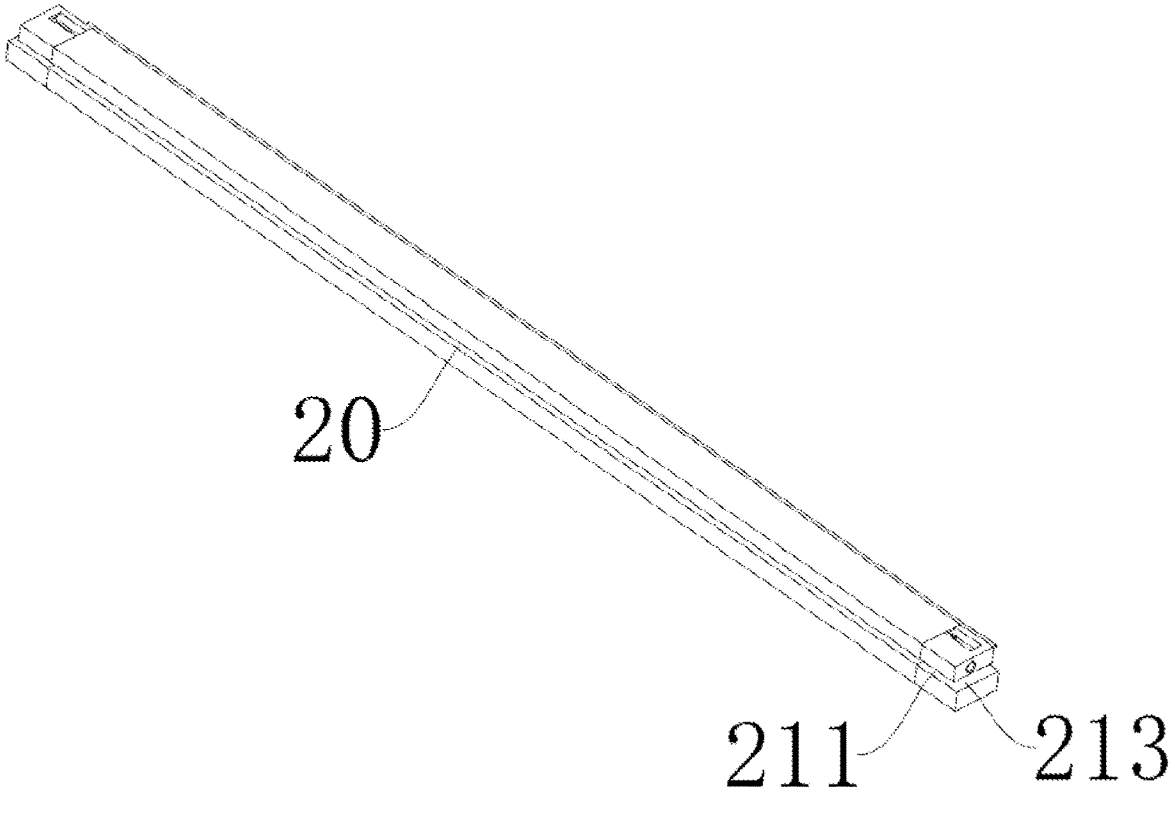
FIG. 8 is a structural diagram of a single lighting fixture.
Figure 9:
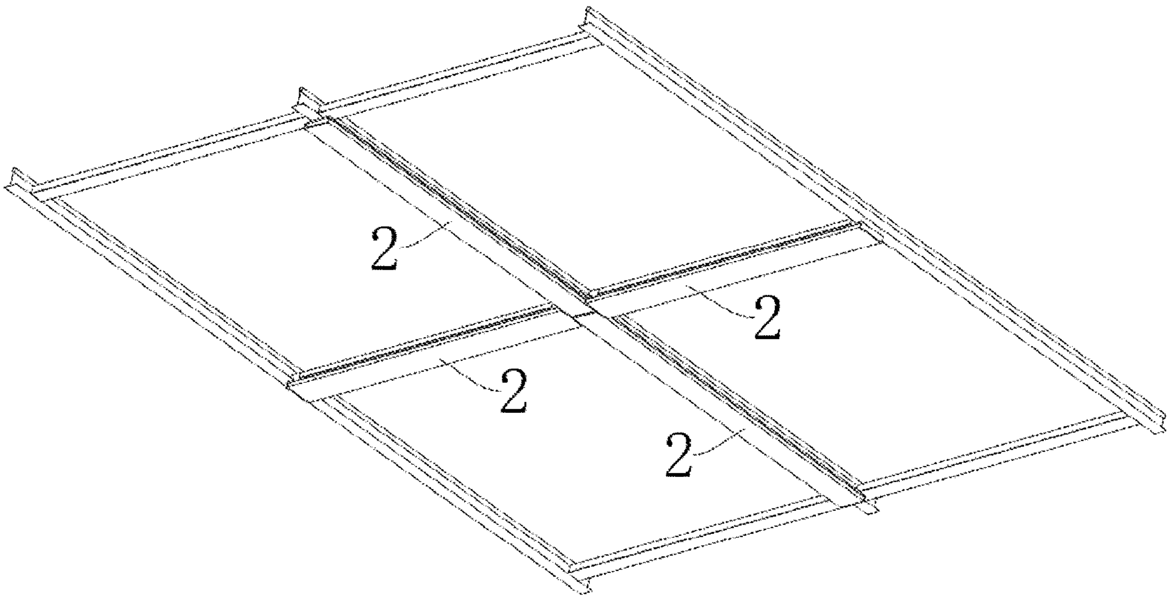
FIG. 9 is a front view of a wide-body structure assembled from the single lighting fixtures.
Figure 10:
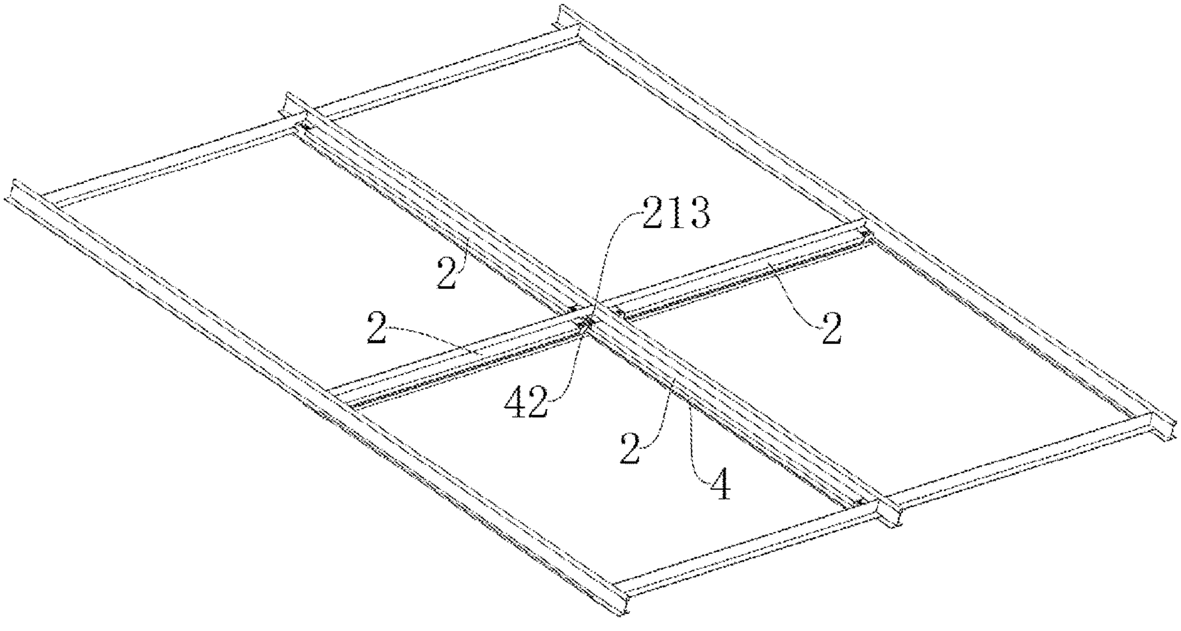
FIG. 10 is a back view of the wide-body structure assembled from the single lighting fixtures.
Figure 11:
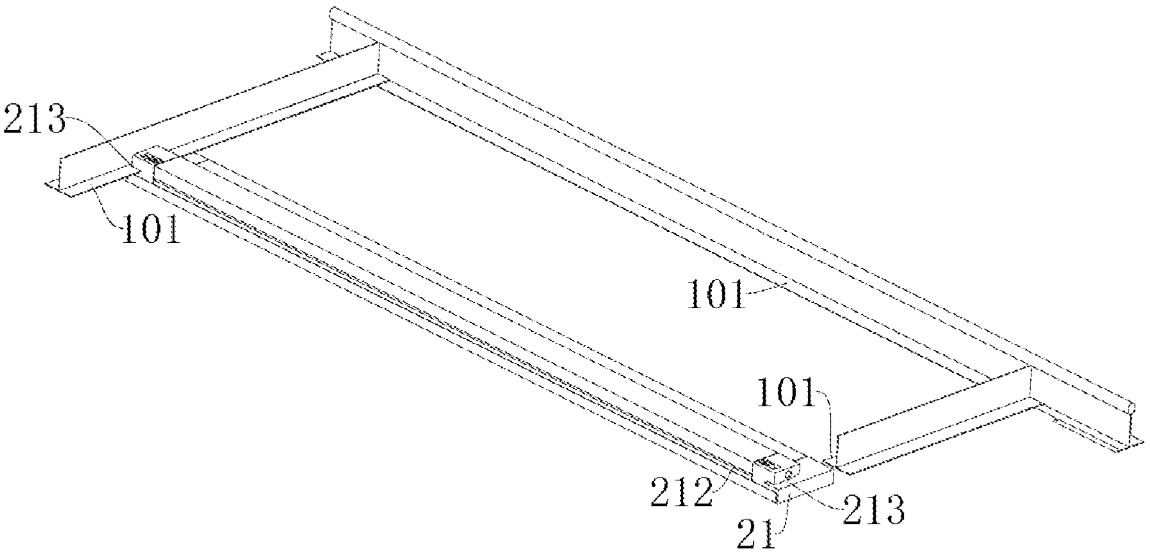
FIG. 11 is a partial view.
Figure 12:
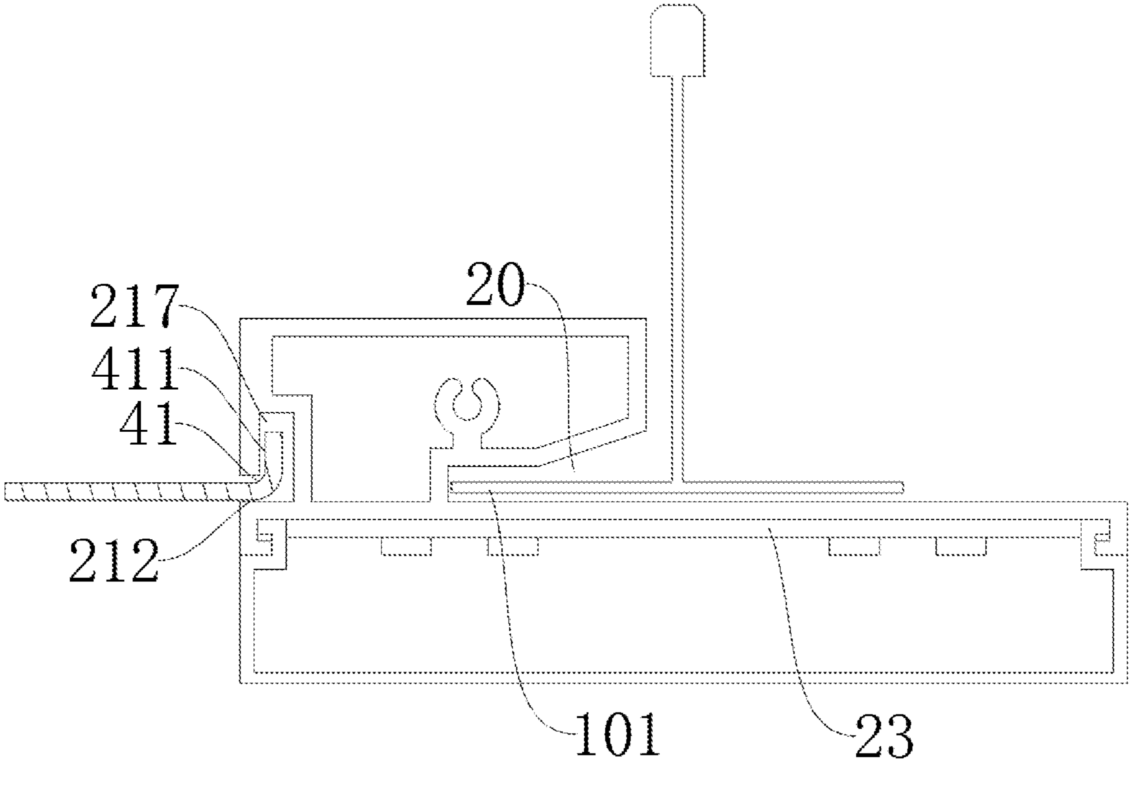
FIG. 12 is a sectional view of the single lighting fixture of the wide-body structure.
Figure 13:
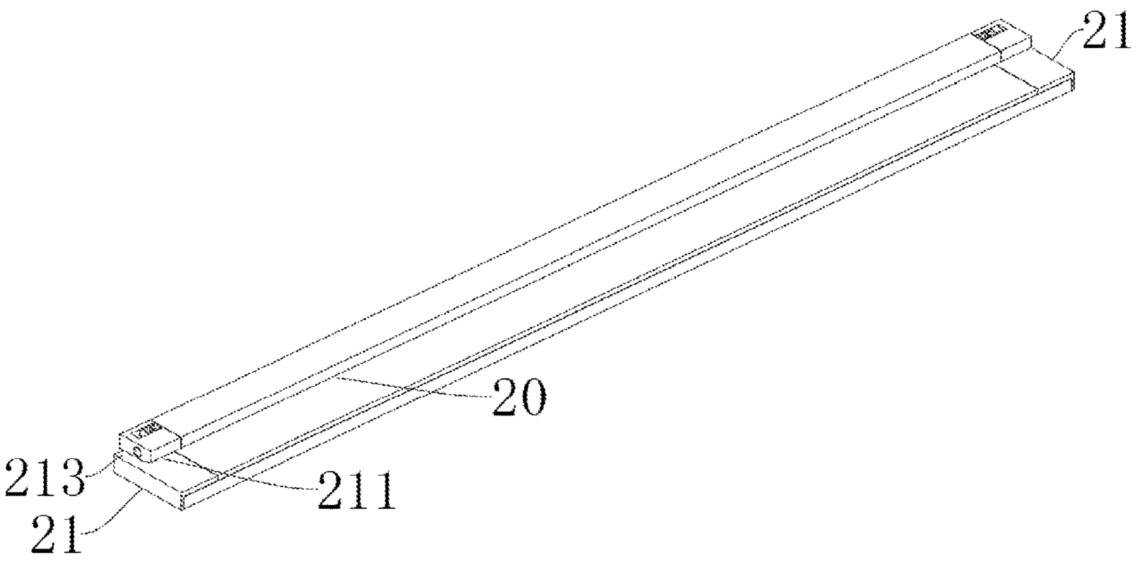
FIG. 13 is an assembly structure diagram of the single lighting fixture of the wide-body structure.
Figure 14:
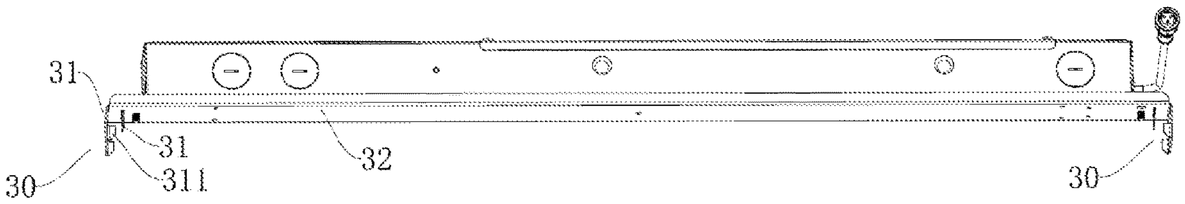
FIG. 14 is a structural diagram (I) of a driver box.
Figure 15:
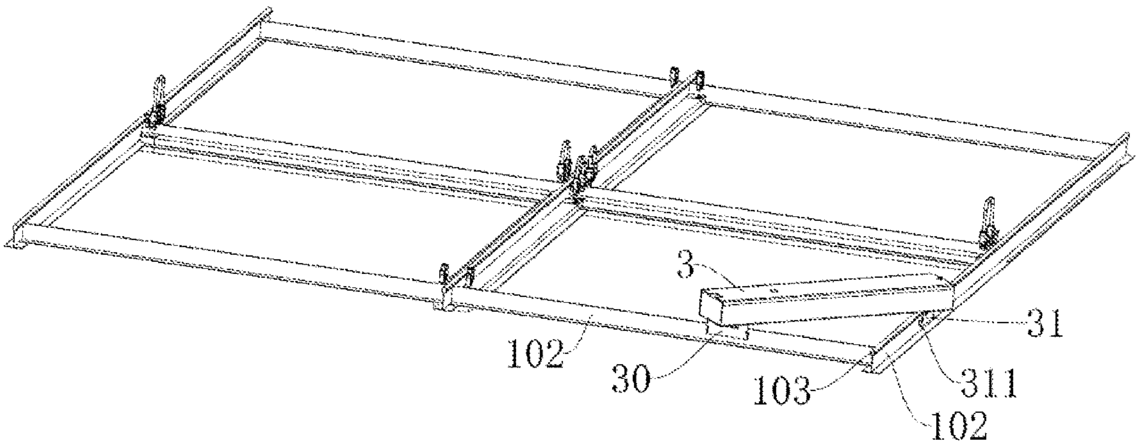
FIG. 15 is a structural diagram of the driver box assembled on frames.
Figure 16:
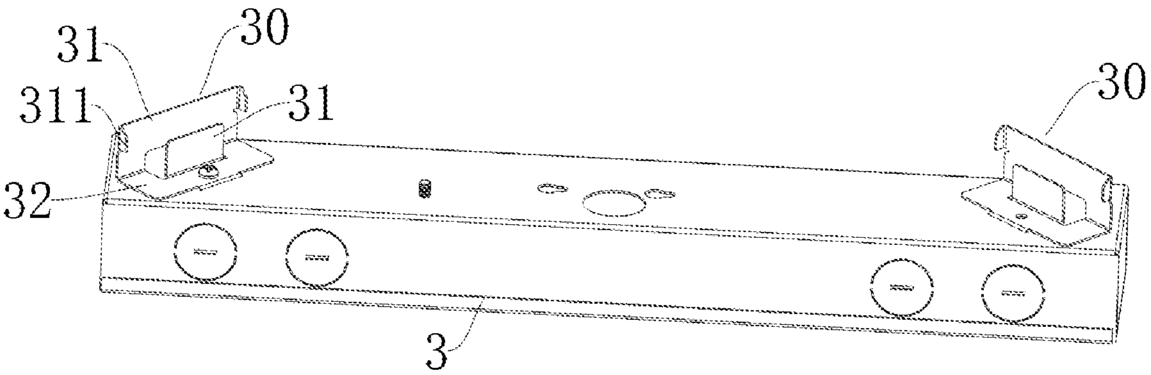
FIG. 16 is a structural diagram (II) of the driver box.
Figure 17:
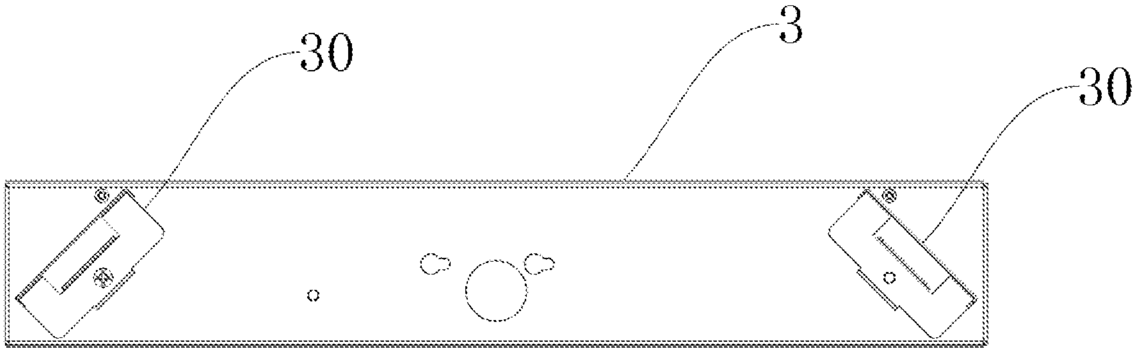
FIG. 17 is a structural diagram (III) of the driver box.

The present invention will be described in detail as an example by an embodiment in the drawings for ease of understanding of the technical information herein.

Embodiment

A lighting system assembled from lighting fixtures described in this embodiment includes electrical connection sockets 21, electrical connectors 5, a connecting structure 1, and plug connectors 210. A plurality of single lighting fixtures 2 to be assembled are of a cuboid or cylindrical structure, and the plurality of single lighting fixtures 2 are assembled and mounted on the connecting structure 1 by fitting the electrical connection sockets 21 to the connecting structure 1.

Further, the connecting structure 1 includes a plurality of frames 10. Every two adjacent frames 10 of the plurality of frames 10 are spliced perpendicularly to each other and arranged linearly, and every two spaced frames 10 are arranged in parallel to form a square hole in the connecting structure 1. The frames 10 of the single lighting fixtures are located beside the single lighting fixtures 2, a first plug-in portion is provided on each frame 10, and the first plug-in portion is fitted to a second plug-in portion of the single lighting fixture 2 to position the single lighting fixture 2 on the frames 10. The plurality of frames 10 may be made of aluminum or stainless steel as the case may be.

The electrical connection sockets 21 are provided at both ends of the single lighting fixture 2, and a first receiving slit 211 and a third receiving slit 213 are provided on each electrical connection socket 21. The single lighting fixture 2 consists of an elongated housing 22, and a lamp panel 23 which is provided in the elongated housing 22, an elongated opening 221 is provided on one side of the elongated housing 22 facing the lamp panel 23, and a translucent panel 24 is mounted is provided at the elongated opening 221. The elongated housing 22 and the electrical connection socket 21 are both made of plastic, and the first receiving slit 211 and the third receiving slit 213 are both of a through-type structure and communicate with each other.

First, the first plug-in portion is a convex slotting piece 101, a second plug-in portion of the single lighting fixture 2 is a slot 20 fitted to the slotting piece 101, and the first receiving slit 211 is assembled with the slot 20 to form an inserting channel, and the slotting piece 101 is inserted into the inserting channel. The inserting channel is opposite to a second receiving slit 212 on the single lighting fixture 2, and the inserting channel and the second receiving slit 212 are both of an elongated structure.

Second, the connecting structure 1 further includes inserting pieces 4, the inserting pieces 4 are provided in the length direction of the single lighting fixtures 2, a first inserting side 41 and a second inserting side 42 are provided on the inserting piece 4. A groove 217 is formed on an inner wall of the second receiving slit 212, the groove 217 is provided in the length direction of the single lighting fixture 2, a hook body 411 is provided on the first inserting side 41, and the hook body 411 is provided in the length direction of the inserting piece 4. When the first inserting side 41 is inserted into the second receiving slit 212 of the single lighting fixture 2, the hook body 411 is inserted into the groove 217 to fixedly mount the single lighting fixture 2.

Figure 18:
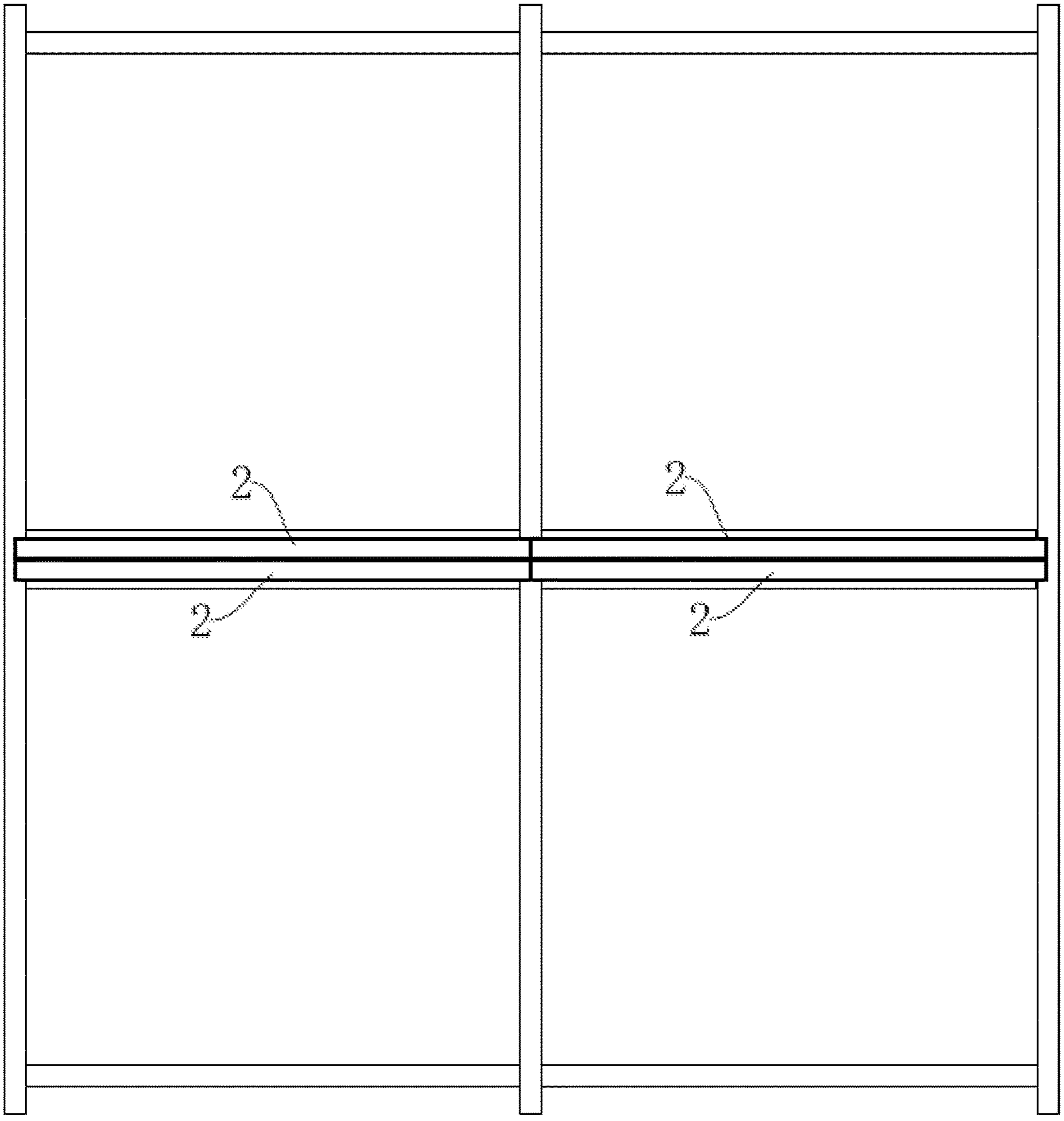
FIG. 18 is a structural diagram (T) of the lighting fixtures assembled linearly.
Figure 19:
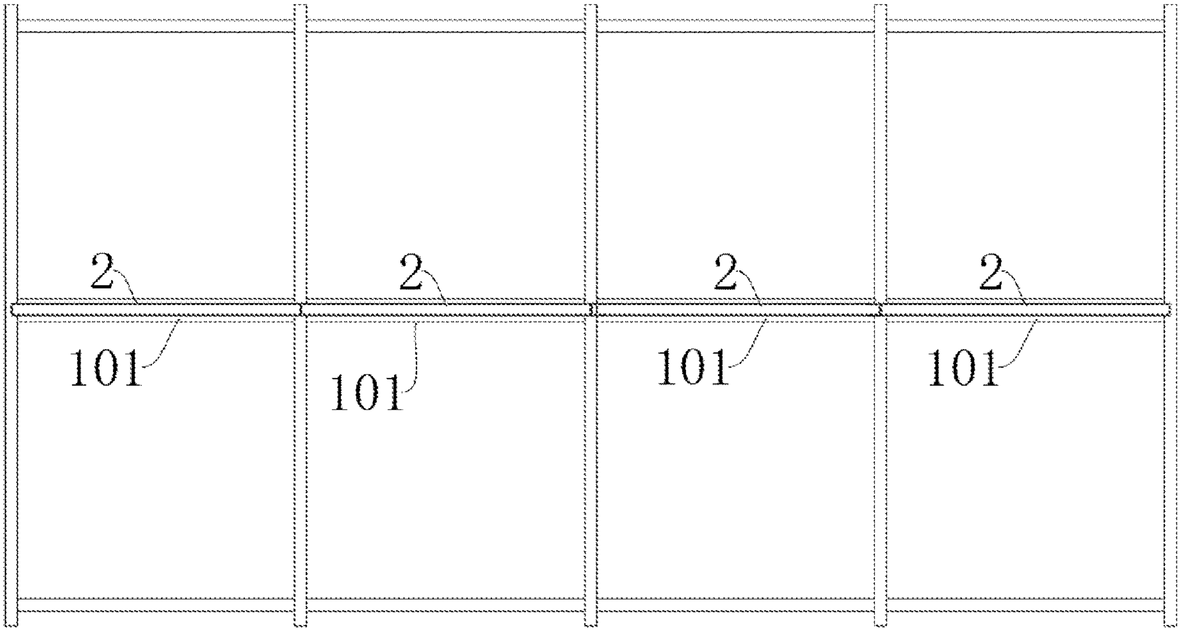
FIG. 19 is a structural diagram (II) of the lighting fixtures assembled linearly.
Figure 20:
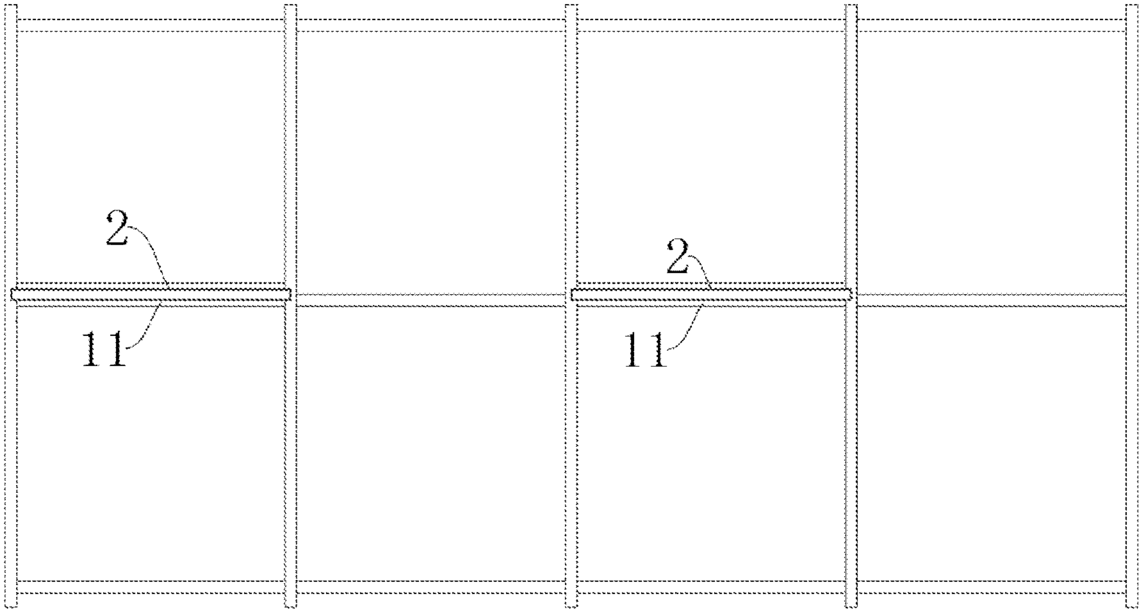
FIG. 20 is a structural diagram (III) of the lighting fixtures assembled linearly.
Figure 21:
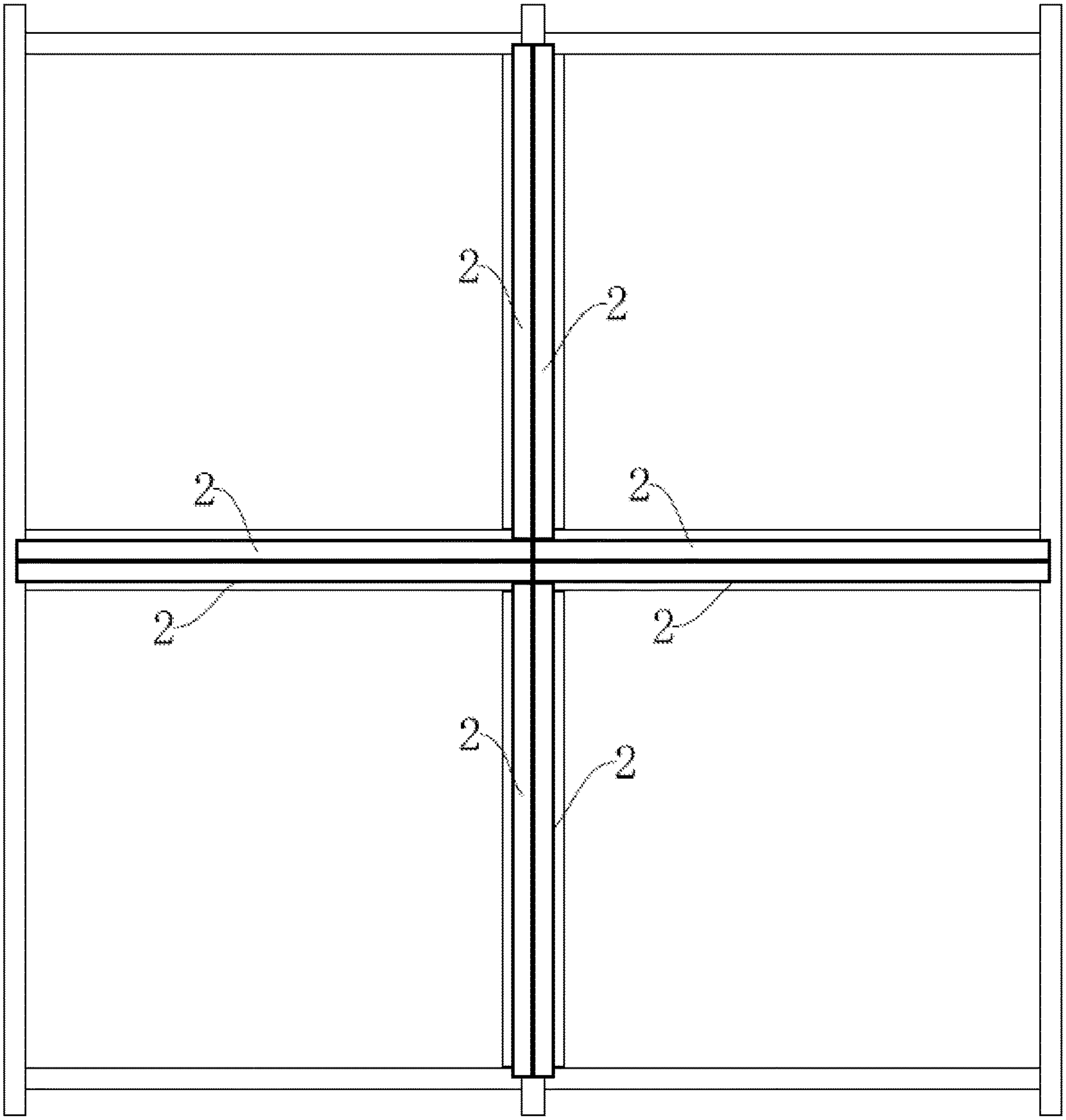
FIG. 21 is a structural diagram (I) of the lighting fixtures assembled perpendicularly to each other.
Figure 22:
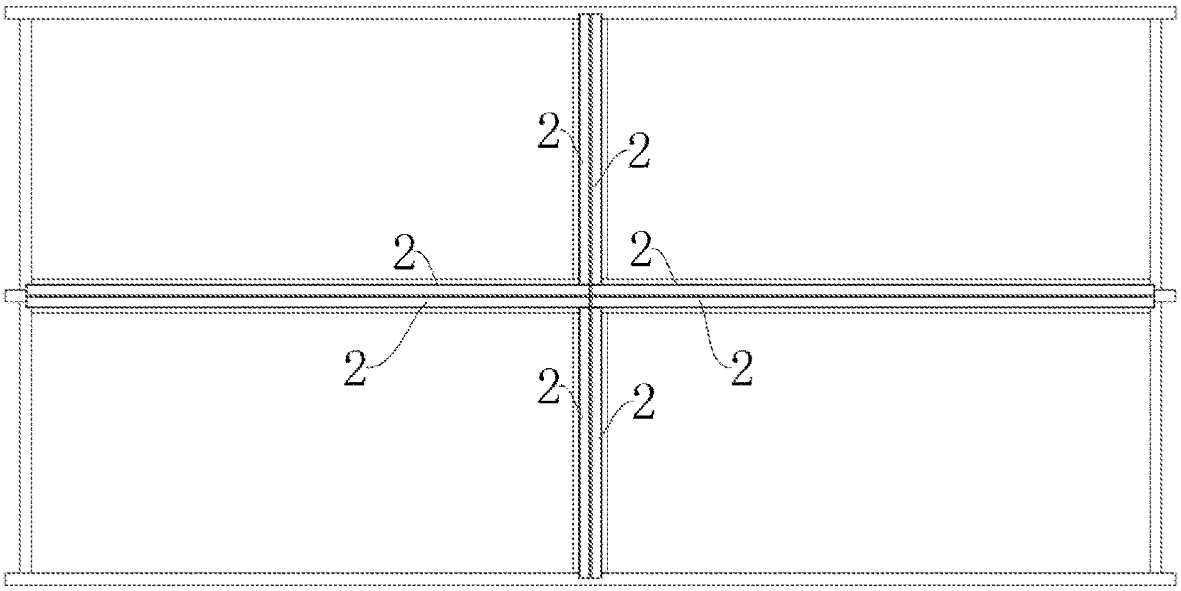
FIG. 22 is a structural diagram (11) of the lighting fixtures assembled perpendicularly to each other.
Figure 23:
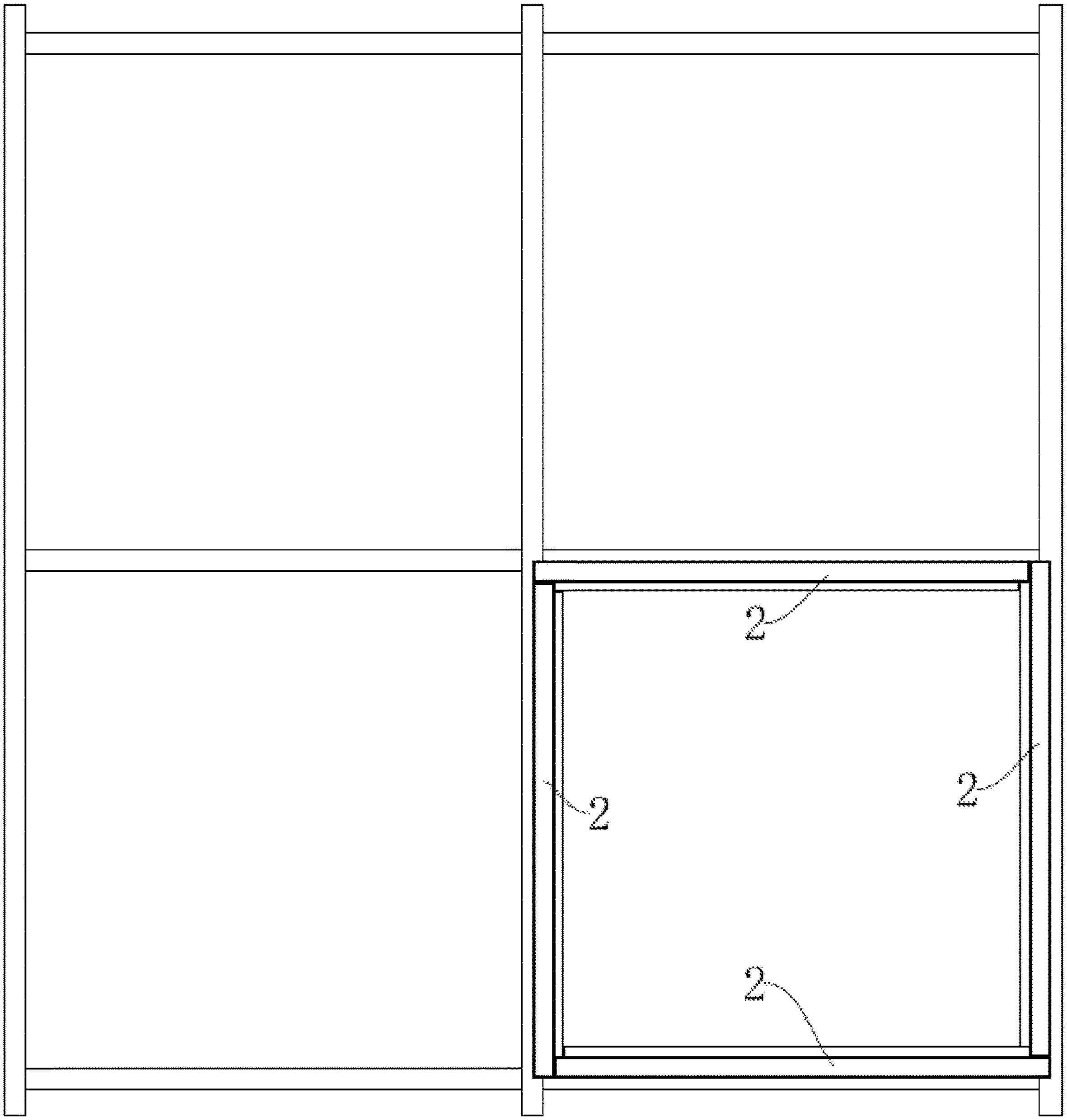
FIG. 23 is a structural diagram (I) of the lighting fixtures assembled annularly.
Figure 24:
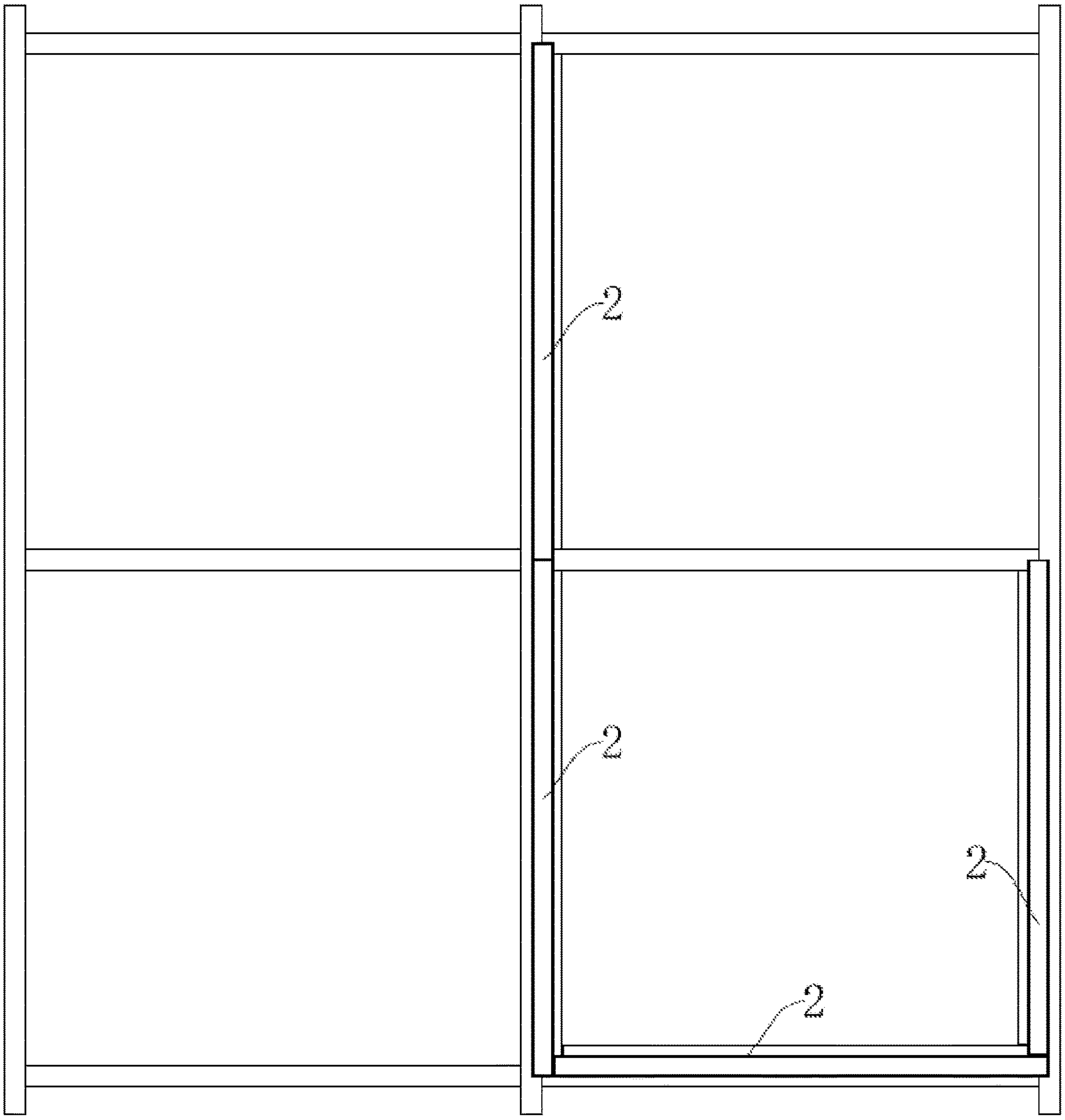
FIG. 24 is a structural diagram (I) of the lighting fixtures assembled both perpendicularly to each other and linearly.
Figure 25:
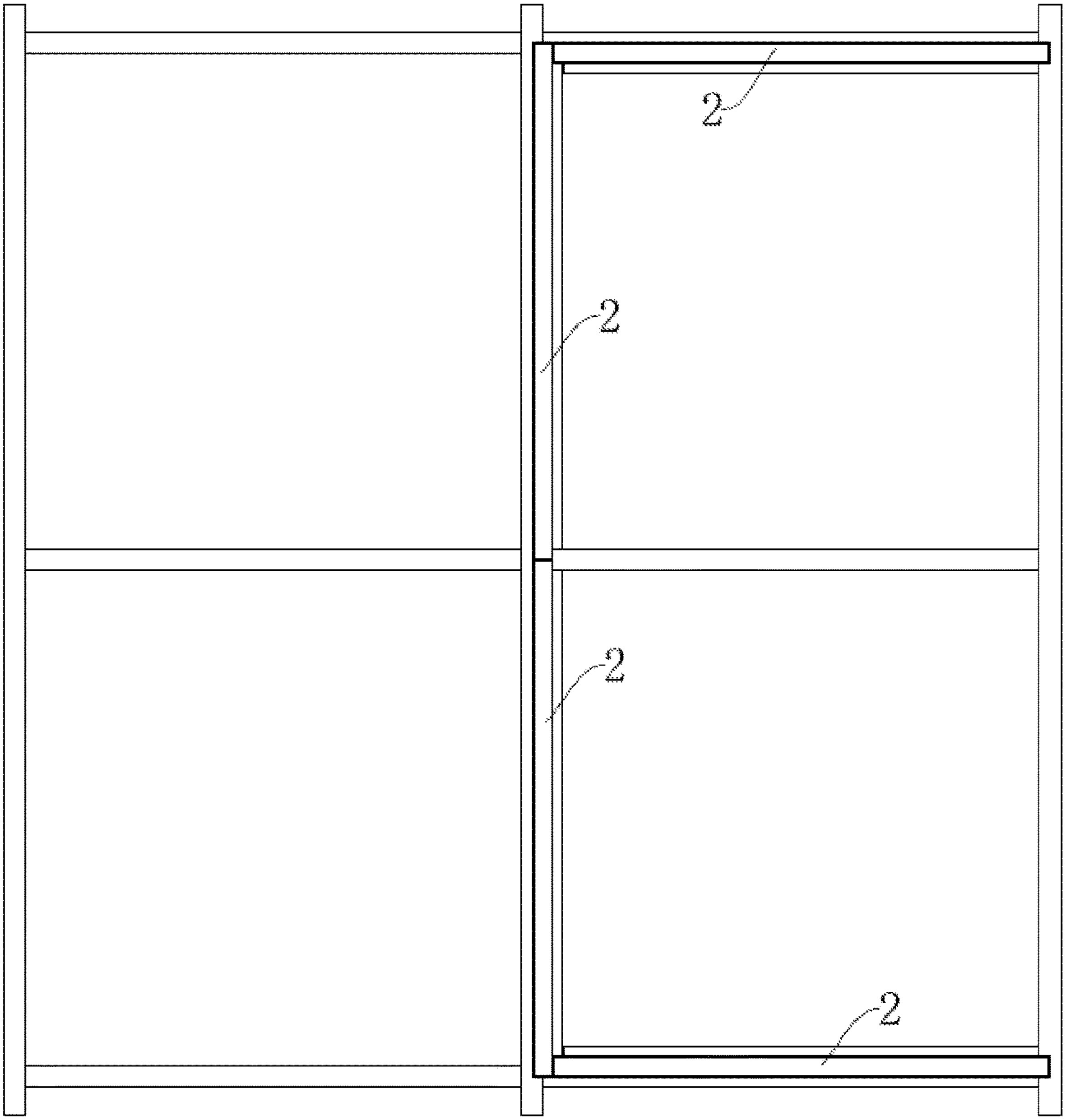
FIG. 25 is a structural diagram (II) of the lighting fixtures assembled both perpendicularly to each other and linearly.
Figure 26:
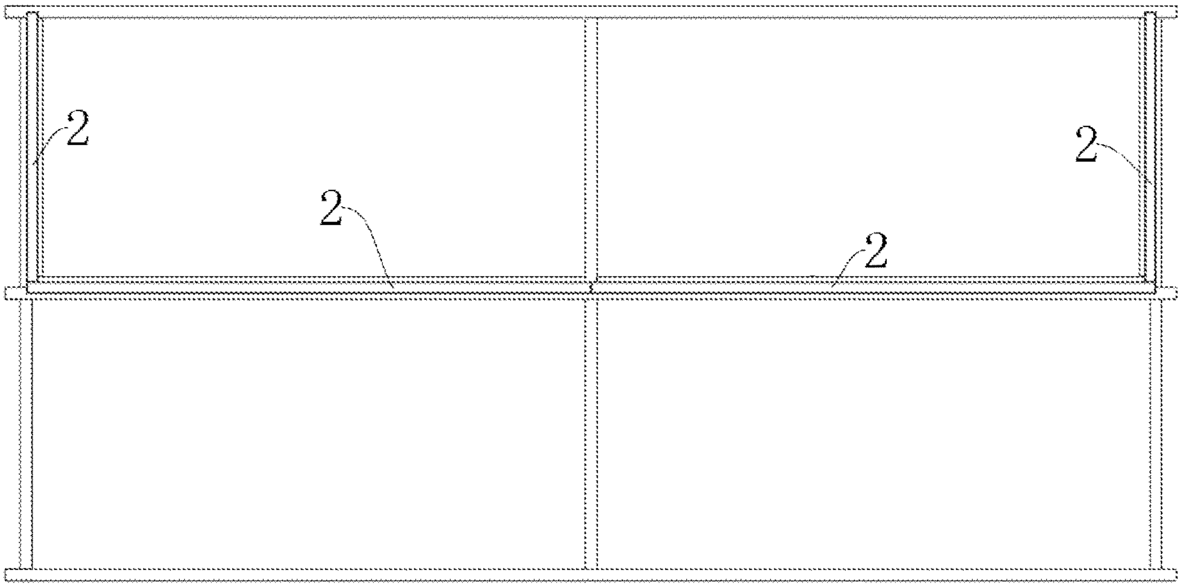
FIG. 26 is a structural diagram (III) of the lighting fixtures assembled both perpendicularly to each other and linearly.
Figure 27:
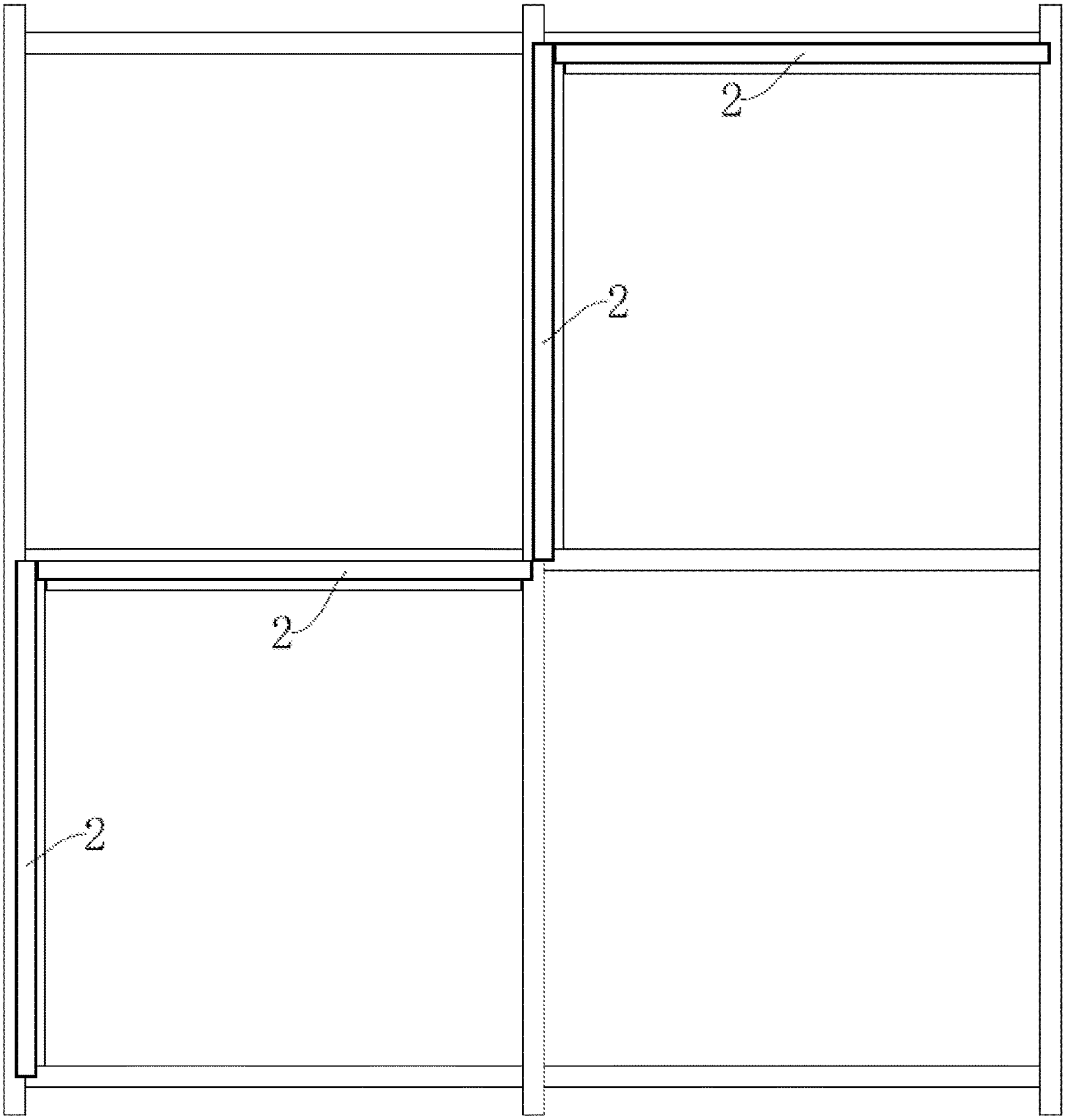
FIG. 27 is a structural diagram (III) of the lighting fixtures assembled perpendicularly to each other.
Figure 28:
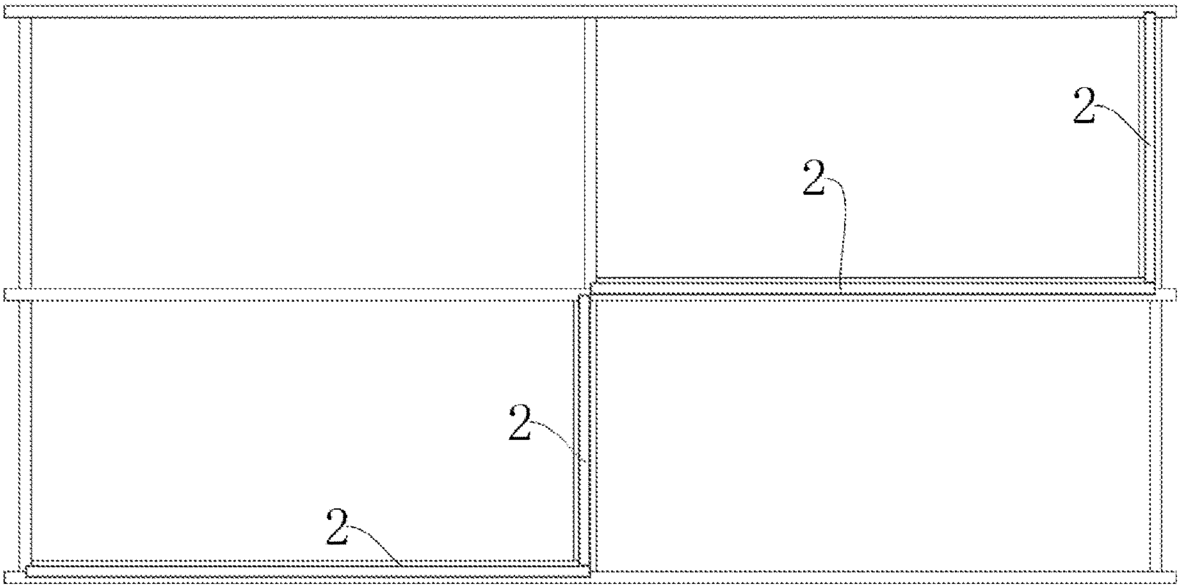
FIG. 28 is a structural diagram (IV) of the lighting fixtures assembled perpendicularly to each other.
Figure 29:
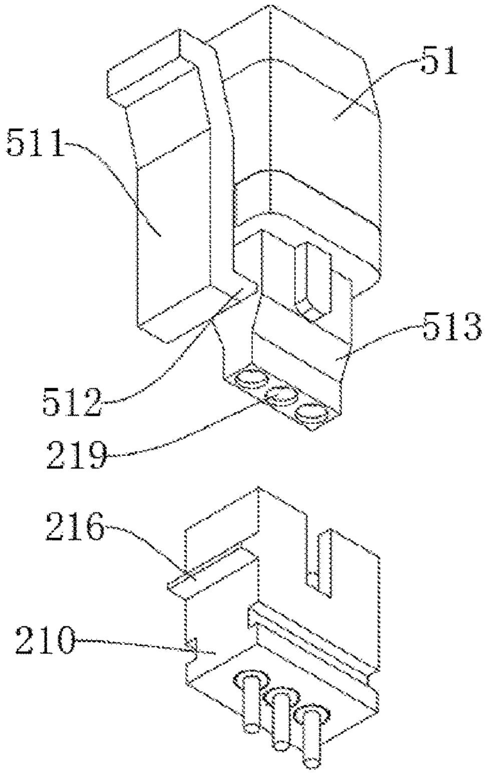
FIG. 29 is an exploded view of a plug connector and a plug, in which: 1. Connecting structure; 10. Frame; 101. Slotting piece; 102. Erected portion; 103. Stop bulge; 2. Single lighting fixture; 20. Slot; 21. Electrical connection socket; 210. Plug connector; 211. First receiving slit; 212. Second receiving slit; 213. Third receiving slit; 214. Elongated jack; 215. Clamping cavity; 216. Retainer; 217. Groove; 218. Connecting slot; 22. Elongated housing; 23. Lamp panel; 24. Translucent panel; 221. Elongated opening; 3. Driver box; 30. Clamping structure; 31. Clamping piece; 311. Stopper; 4. Inserting piece; 41. First inserting side; 411. Hook body; 42. Second inserting side; 5. Electric connector; 51. Plug; 510. Elastic element; 511. Trigger piece; 512. Fastener; 513. Connector block.

Based on the above, the connection structure 1 allows for a variety of assembly ways using the plurality of single lighting fixtures 2 and the electrical connection sockets 21 on the single lighting fixtures 2, so that the plurality of single lighting fixtures 2 may be assembled linearly or perpendicularly to each other. When the plurality of single lighting fixtures 2 are assembled linearly, the assembly ways as shown in FIGS. 18, 19 and 20 are allowed. FIG. 20 is an assembly way in which the plurality of single lighting fixtures 2 are spaced. When the plurality of single lighting fixtures 2 are assembled perpendicularly to each other, the assembly ways as shown in FIGS. 21, 22, 23, 27 and 28 are allowed. Of course, as shown in FIGS. 24 to 26, the lighting fixtures may also be assembled both linearly and perpendicularly to each other. In the assembly ways as shown in FIGS. 21 to 28, the single lighting fixture may be adjusted in length according to the actual situation. The single lighting fixtures with different or the same length may be assembled together.

To assemble the lighting fixtures linearly, all the lighting fixtures 2 are linearly arranged on the plurality of corresponding frames 10, and the slotting pieces 101 are inserted into the corresponding inserting channels. The slotting pieces 101 at both ends of the single lighting fixture 2 are respectively inserted into the third receiving slits 213 at both ends of the single lighting fixture 2, so as to position the plurality of single lighting fixtures 2 linearly, and the frames 10 for arranging the single lighting fixtures 2 are parallel to the single lighting fixtures 2.

To assemble the lighting fixtures perpendicularly to each other, all the lighting fixtures 2 are perpendicularly arranged on the frames 10 respectively so that the plurality of single lighting fixtures 2 are assembled perpendicularly to each other, the slotting pieces 101 are inserted into the corresponding inserting channels, and the slotting piece 101 at one end of the single lighting fixture 2 is inserted into a third receiving slit 213 at one end of the single lighting fixture 2. In this case, since the inserting pieces 4 are mounted on the single lighting fixtures 2 already mounted on the frames 10, the second inserting side 42 is located between the electrical connection sockets 21 of the two adjacent single lighting fixtures 2, the second inserting side 42 is inserted into the third receiving slit 213 opposite to the second receiving slit 212 of the single lighting fixture 2, and the frames 10 for arranging the single lighting fixtures 2 are parallel to the single lighting fixtures 2.

Alternatively, all the lighting fixtures 2 are perpendicularly assembled on the frames 10 respectively so that the plurality of single lighting fixtures 2 are assembled perpendicularly to each other, the slotting pieces 101 are correspondingly inserted into the inserting channels, and the slotting pieces 101 at both ends of the single lighting fixture 2 are correspondingly inserted into the third receiving slits 213 at both ends of the single lighting fixture 2. In this case, since the inserting pieces 4 are mounted on the single lighting fixtures 2 already mounted on the frames 10, the second inserting side 42 is located between the electrical connection sockets 21 of the two adjacent single lighting fixtures 2, and the second inserting side 42 is inserted into the third receiving slit 213 opposite to the second receiving slit 212 of the single lighting fixture 2.

In this embodiment, two plugs 51 are electrically connected to the electrical connector 5, and a plug connector 210 is provided on the electrical connection socket 21. The plugs 51 on the electrical connector 5 are plugged into the plug connectors 210 of the two single lighting fixtures 2, respectively so that the two single lighting fixtures 2 can be electrically connected.

Further, a connecting slot 218 is provided on the plug connector 210, a connector block 513 is provided on the plug 51, the connector block 513 is plugged into the connecting slot 218, and a conductive element 219 on the connector block 513 is propped against a conductive element 219 in the connecting slot 218. This structure allows for easy electrical connection and quick plug-in connection.

Preferably, an elongated jack 214 is provided on the electrical connection socket 21, and the plug connector 210 is mounted in the elongated jack 214. As the jack is longer than the plug connector 210, a clamping cavity 215 is formed between an outer wall at one end of the plug connector 210 and an inner wall at one end of the elongated jack. A retainer 216 is provided on the plug connector 210, the retainer 216 is located in the clamping cavity 215, an elastic element 510 is provided on one side of the plug 51 facing the clamping cavity 215, a trigger piece 511 is provided on the elastic element 510, a fastener 512 is provided on one side of a lower end of the trigger piece 511 facing the fastener 512, and the fastener 512 is in clamping fit with the retainer 216 so that the plug 51 is plugged into and fixed to the plug connector 210. During removal, the fastener 512 can be detached from the retainer 216 by pressing the upper end of the trigger piece, and thus the plug can be detached from the plug connector 210. A housing of the plug 51 is made of plastic, and the elastic element 510, the trigger piece 511 and the housing of the plug 51 are assembled into a one-piece structure by injection molding, so the elastic element is made of plastic.

In this embodiment, after the two lighting fixtures are electrically connected, a driver box 3 can be mounted on the frames 10. The driver box 3 is electrically connected to one single lighting fixture 2 by conductive wires.

The driver box 3 is obliquely located above the two frames 10 perpendicular to each other, clamping structures 30 are mounted on the bottom surface at both ends of the driver box 3, each clamping structure 30 includes two clamping pieces 31 provided in the length direction of the frames 10, and an erected portion 102 of each frame 10 is clamped between the two clamping pieces 31. A stop bulge 103 is provided on an upper end of the erected portion 102 of the frame 10, a stopper 311 is provided on an inner wall of a lower end of at least one clamping piece 31, and the stopper 311 is opposite to the stop bulge 103. Here, the clamping pieces 31 are obliquely provided with respect to the driver box 3, and an angle between the clamping pieces 31 of the two clamping structures 30 is 90 degrees.

Alternatively, the driver box 3 is located above the two frames 10 spaced apart from each other, the driver box 3 is parallel to the two vertical frames 10 and perpendicular to the two transverse frames 10, clamping structures 30 are mounted on the bottom surface at both ends of the driver box 3, each clamping structure 30 includes two clamping pieces 31 provided in the length direction of the frames 10, and an erected portion 102 of each frame 10 is clamped between the two clamping pieces 31; a stop bulge 103 is provided on an upper end of the erected portion 102 of the frame 10, a stopper 311 is provided on an inner wall of a lower end of at least one clamping piece 31, and the stopper 311 is opposite to the stop bulge 103. The clamping pieces 31 of the two clamping structures 30 are parallel to each other.

The above two mounting methods of the driver box 3 can be selected according to the actual situation and both facilitate the installation process, in which the driver box 3 can be mounted by instant snap-in, thus improving the installation efficiency. The two clamping pieces 31 may be fixed to the bottom surface of the housing of the driver box 3 by connecting plates 32, the connecting plates 32 are bolted on the bottom surface of the housing of the driver box 3, the two clamping pieces 31 and the connecting plates are of a one-piece structure, or one clamping piece 31 and the connecting plate 32 are of a one-piece structure, while the other clamping piece 31 and the bottom surface of the housing of the driver box are of a one-piece structure, and this clamping piece 31 runs through the connecting plate.

What is claimed is:

1. A lighting system assembled from lighting fixtures, comprising:

electrical connection sockets, wherein the electrical connection sockets are provided on single lighting fixtures;

electrical connectors, wherein two plugs are electrically connected to the electrical connectors;

a connecting structure, wherein the connecting structure is used for assembling and connecting the plurality of single lighting fixtures;

plug connectors, wherein the plug connectors are provided on the electrical connection sockets, the plurality of single lighting fixtures are assembled linearly or perpendicularly to each other on the connecting structure, and the plugs on the electrical connector are plugged into the plug connector of the two single lighting fixtures, respectively, so that the two single lighting fixtures are electrically connected, and the connecting structure comprises a plurality of frames, the frames of the single lighting fixtures are located beside the single lighting fixtures, a first plug-in portion is provided on each frame, and the first plug-in portion is fitted to a second plug-in portion of the single lighting fixture to position the single lighting fixture on the frames.

2. The lighting system assembled from lighting fixtures according to claim 1, wherein every two adjacent frames of the plurality of frames are spliced perpendicularly to each other or arranged linearly, and every two spaced frames are arranged in parallel; when all the single lighting fixtures are linearly arranged on the frames respectively, the plurality of single lighting fixtures are assembled linearly; when all the single lighting fixtures are perpendicularly arranged on the frames, the plurality of single lighting fixtures are assembled perpendicularly to each other, and the frames for arranging the single lighting fixtures are parallel to the single lighting fixtures.

3. The lighting system assembled from lighting fixtures according to claim 2, wherein the first plug-in portion is a convex slotting piece, a second plug-in portion of the single lighting fixture is a slot fitted to the slotting piece, a first receiving slit is provided on the electrical connection socket, the first receiving slit is assembled with the slot to form an inserting channel, and the slotting piece is inserted into the inserting channel.

4. The lighting system assembled from lighting fixtures according to claim 3, wherein the connecting structure further comprises inserting pieces, the inserting pieces are provided in the length direction of the single lighting fixtures, a first inserting side and a second inserting side are provided on the inserting piece, the first inserting side is inserted into the second receiving slit of the single lighting fixture, a third receiving slit is provided on the electrical connection socket, and the inserting piece is close to the end of the single lighting fixture is inserted into the corresponding third receiving slit on the single lighting fixture; when the single lighting fixtures are assembled perpendicularly to each other, the second inserting side is located between the electrical connection sockets of the two adjacent single lighting fixtures, and the second inserting side is inserted into the third receiving slit opposite to the second receiving slit of the single lighting fixture.

5. The lighting system assembled from lighting fixtures according to claim 4, further comprising a groove provided on an inner wall of the second receiving slit of the single lighting fixture, wherein the groove is provided in the length direction of the inserting piece, and a hook body is provided on a first inserting side, and the hook body is inserted into the groove so that the inserting piece is fixed to the single lighting fixture.

6. The lighting system assembled from lighting fixtures according to claim 2, further comprising a driver box, wherein the driver box is mounted on the frames, and the driver box is electrically connected to at least one single lighting fixture by conductive wires.

7. The lighting system assembled from lighting fixtures according to claim 6, wherein the driver box is obliquely located above the two frames perpendicular to each other, clamping structures are mounted on the bottom surface at both ends of the driver box, each clamping structure includes two clamping pieces provided in the length direction of the frames, and an erected portion of each frame is clamped between the two clamping pieces; a stop bulge is provided on an upper end of the erected portion of the frame, a stopper is provided on an inner wall of a lower end of at least one clamping piece, and the stopper is opposite to the stop bulge.

8. The lighting system assembled from lighting fixtures according to claim 6, wherein the driver box is located above the two frames spaced apart from each other, the driver box is parallel to the two vertical frames and perpendicular to the two transverse frames, clamping structures are mounted on the bottom surface at both ends of the driver box, each clamping structure includes two clamping pieces provided in the length direction of the frames, and an erected portion of each frame is clamped between the two clamping pieces; a stop bulge is provided on an upper end of the erected portion of the frame, a stopper is provided on an inner wall of a lower end of at least one clamping piece, and the stopper is opposite to the stop bulge.

9. The lighting system assembled from lighting fixtures according to claim 1, wherein a connecting slot is provided on the plug connector, and a connector block is provided on the plug, the connector block is plugged into the connecting slot, and a conductive element on the connector block is propped against a conductive element in the connecting slot.

10. The lighting system assembled from lighting fixtures according to claim 8, wherein an elongated jack is provided on the electrical connection socket, and the plug connector is mounted in the elongated jack; as the jack is longer than the plug connector, a clamping cavity is formed between an outer wall at one end of the plug connector and an inner wall at one end of the elongated jack; a retainer is provided on the plug connector, the retainer is located in the clamping cavity, an elastic element is provided on one side of the plug facing the clamping cavity, a trigger piece is provided on the elastic element, a fastener is provided on one side of a lower end of the trigger piece facing the retainer, and the fastener is in clamping fit with the retainer, so that the plug is plugged into and fixed to the plug connector.

* * * * *